US011892794B2

(12) United States Patent
Ohira et al.

(10) Patent No.: US 11,892,794 B2
(45) Date of Patent: Feb. 6, 2024

(54) IMAGE FORMING APPARATUS

(71) Applicant: BROTHER KOGYO KABUSHIKI KAISHA, Nagoya (JP)

(72) Inventors: Ayaka Ohira, Nagoya (JP); Tomonori Watanabe, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/067,124

(22) Filed: Dec. 16, 2022

(65) Prior Publication Data

US 2023/0205125 A1 Jun. 29, 2023

(30) Foreign Application Priority Data

Dec. 28, 2021 (JP) ................................. 2021-214946

(51) Int. Cl.
*G03G 15/20* (2006.01)
*G03G 15/00* (2006.01)
*G03G 21/16* (2006.01)

(52) U.S. Cl.
CPC ....... *G03G 15/657* (2013.01); *G03G 15/2064* (2013.01); *G03G 21/1619* (2013.01); *G03G 2215/00616* (2013.01); *G03G 2215/0407* (2013.01); *G03G 2215/2035* (2013.01)

(58) Field of Classification Search
CPC ............. G03G 15/657; G03G 15/2064; G03G 21/1619; G03G 2215/00616; G03G 2215/0407; G03G 2215/2035; G03G 2215/0062
See application file for complete search history.

(56) References Cited

U.S. PATENT DOCUMENTS 4,556,779 A * 12/1985 Hashimoto ........ G03G 15/2039 219/471
9,025,973 B2 * 5/2015 Suzuki ............... G03G 21/1633 399/21
2007/0253756 A1 * 11/2007 Uehara .............. G03G 15/2028 399/322
2013/0322894 A1 12/2013 Ishida et al.
2021/0191302 A1 * 6/2021 Mizuno .............. G03G 15/2064

FOREIGN PATENT DOCUMENTS

JP 2012113168 A * 6/2012 ......... G03G 15/2028
JP 2013-250391 A 12/2013

* cited by examiner

*Primary Examiner* — Sevan A Aydin
(74) *Attorney, Agent, or Firm* — Merchant & Gould P.C.

(57) ABSTRACT

An image forming apparatus includes a fixing device including a fixing device frame, a chute rotatable between a path forming position and a path opening position, an optical sensor including a light-emitting element, and an actuator. The actuator has a shaft, a first lever configured to contact an anti-pivot rib, and a second lever configured to shield light emitted from the light-emitting element. The actuator is movable to a position where the first lever contacts the anti-pivot rib when the chute is at the path forming position, a position where the first lever and the anti-pivot rib are separated from each other when the chute is at the path forming position, and a position where the first lever and the anti-pivot rib are separated from each other when the chute is at the path opening position. The actuator and the optical sensor are supported by the fixing device frame.

23 Claims, 13 Drawing Sheets

IMAGE FORMING APPARATUS

REFERENCE TO RELATED APPLICATIONS

This application claims priority from Japanese Patent Application No. 2021-214946 filed on Dec. 28, 2021. The entire content of the priority application is incorporated herein by reference.

BACKGROUND ART

Aspects of the present disclosure relate to image forming apparatuses.

Conventionally, there has been known an image forming apparatus provided with a chute which forms a conveying path on a downstream side in a sheet conveying direction of a fixing device and is configured to pivot with respect to an apparatus main body, an actuator which is pivotably provided to the chute and has a lever which projects toward the conveying path, and a sensor which is provided to the apparatus main body and detects the actuator. The sensor detects a sheet by detecting the pivoting of the actuator.

DESCRIPTION

In such an image forming apparatus, since the actuator is provided to the chute and the sensor is provided to the apparatus main body, it is necessary to dispose the sensor below the chute or at an edge of the chute in a width direction perpendicular to the sheet conveying direction.

On the other hand, for example, when the fixing device of the image forming apparatus grows in size, if the sensor is disposed while maintaining the size of the apparatus main body, the sensor interferes with components such as a gear disposed at the edge in the width direction of the chute, and it becomes difficult to secure a space for disposing the sensor.

At least one aspect of the present disclosure is advantageous to provide one or more improved techniques to achieve an image forming apparatus in which an actuator and a sensor can be disposed while preventing or suppressing increase in size of the apparatus main body even when the fixing device grows in size.

According to aspects of the present disclosure, there is provided an image forming apparatus including a fixing device configured to fix toner on a sheet and including a heater and a fixing device frame configured to support the heater, a chute configured to pivot between a path forming position at which the chute forms a portion of a conveying path downstream of the fixing device in a sheet conveying direction and a path opening position at which the chute opens the conveying path, an optical sensor including a light-emitting element configured to emit light and a light-receiving element configured to receive light emitted from the light-emitting element, and an actuator. The actuator has a shaft extending in a width direction perpendicular to the sheet conveying direction, a first lever projecting from the shaft and configured to contact an anti-pivot rib, and a second lever projecting from the shaft and configured to shield light emitted from the light-emitting element of the optical sensor. The actuator is movable to a first position where the first lever contacts the anti-pivot rib in a state where the chute is at the path forming position, a second position where the first lever and the anti-pivot rib are separated from each other in a state where the chute is at the path forming position, and a third position where the first lever and the anti-pivot rib are separated from each other in a state where the chute is at the path opening position. The actuator and the optical sensor are supported by the fixing device frame.

According to aspects of the present disclosure, there is further provided an image forming apparatus including a fixing device configured to fix toner on a sheet and including a heater and a fixing device frame configured to support the heater, a chute configured to pivot between a path forming position at which the chute forms a portion of a conveying path downstream of the fixing device in a sheet conveying direction and a path opening position at which the chute opens the conveying path, an optical sensor including a light-emitting element configured to emit light and a light-receiving element configured to receive light emitted from the light-emitting element, and an actuator. The actuator has a shaft extending in a width direction perpendicular to the sheet conveying direction, a first lever projecting from the shaft and configured to contact the chute, and a second lever projecting from the shaft and configured to shield light emitted from the light-emitting element of the optical sensor. The actuator is movable to a first position where the first lever contacts the chute in a state where the chute is at the path forming position, a second position where the first lever and the chute are separated from each other in a state where the chute is at the path forming position, and a third position where the first lever and the chute are separated from each other in a state where the chute is at the path opening position. The actuator and the optical sensor are supported by the fixing device frame.

Hereinafter, illustrative embodiments according to aspects of the present disclosure will be described with reference to the accompanying drawings.

Image Forming Apparatus

Figure 1:
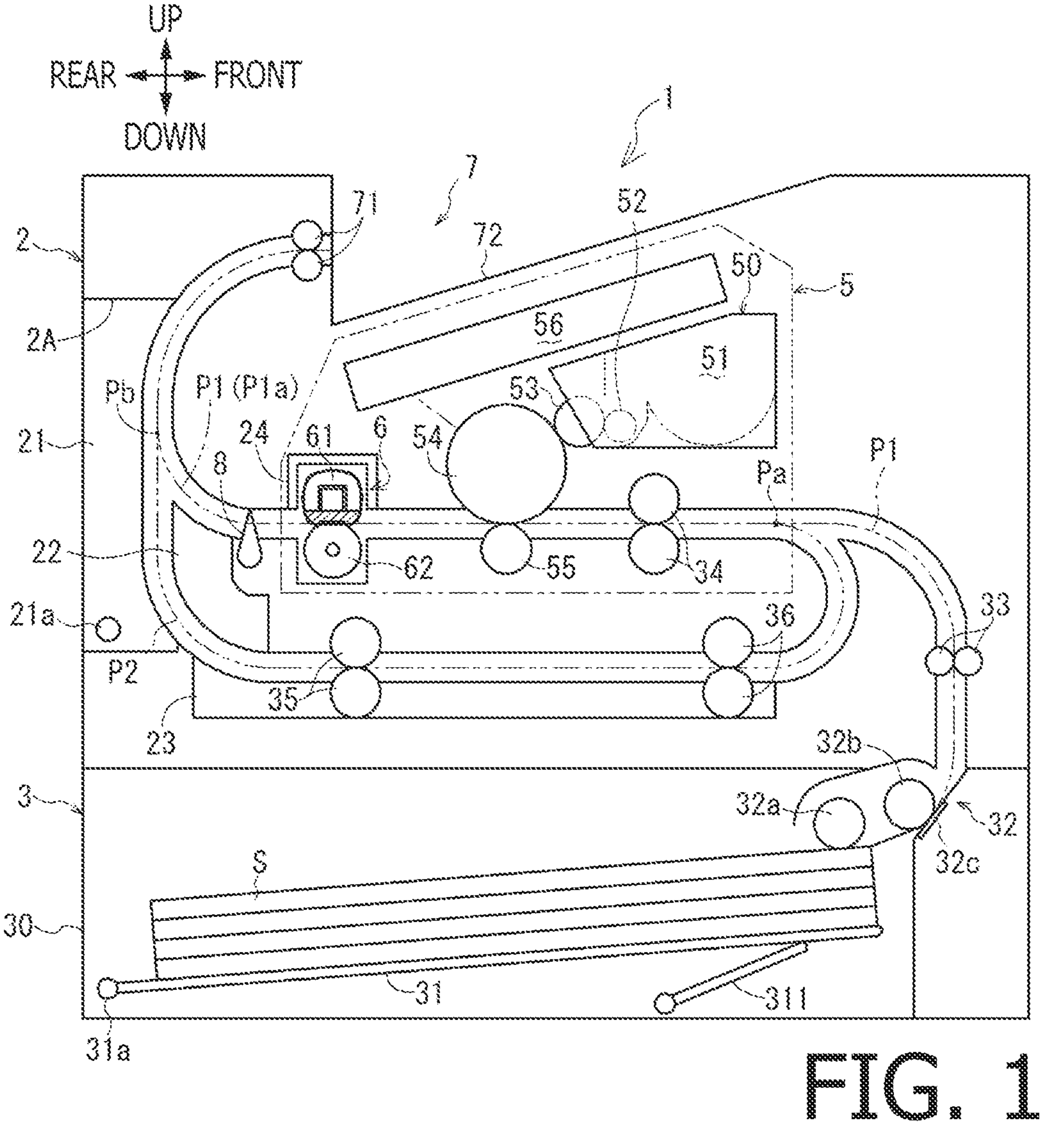
FIG. 1 is a sectional side view of an image forming apparatus.

FIG. 1 shows an image forming apparatus 1 as an illustrative embodiment according to aspects of the present disclosure. The image forming apparatus 1 is a laser printer configured to form an image on a sheet S by an electrophotographic system.

In the following description, the right-hand side in FIG. 1 is defined as a front side of the image forming apparatus 1, the left-hand side in FIG. 1 is defined as a rear side of the image forming apparatus 1, a front side with respect to a plane of FIG. 1 is defined as a left side of the image forming apparatus 1, and a back side with respect to a plane of FIG. 1 is defined as a right side of the image forming apparatus 1. The upper and lower sides in FIG. 1 are defined as upper and lower sides of the image forming apparatus 1, respectively.

The image forming apparatus 1 includes an apparatus main body 2, a sheet feeder 3, an image forming engine 5, a fixing device 6, a sheet discharger 7, and a sheet discharge sensor 8.

The apparatus main body 2 houses the sheet feeder 3, the image forming engine 5, the fixing device 6, the sheet discharger 7, and the sheet discharge sensor 8. An opening 2A is formed on a rear surface of the apparatus main body 2, and the apparatus main body 2 has a rear cover 21 configured to open and close the opening 2A. The rear cover 21 is configured to pivot about a pivot shaft 21*a* at a lower end portion, and is movable between a closed position for closing the opening 2A and an open position for opening the opening 2A by pivoting about the pivot shaft 21*a*.

The sheet feeder 3 includes a sheet feeding tray 30 configured to support the sheet S, a sheet feeding mechanism 32, a conveying roller pair 33, and a registration roller pair 34. The sheet feeder 3 is disposed in a lower portion of the apparatus main body 2 and conveys the sheet S supported by the sheet feeding tray 30 to the image forming engine 5. The image forming apparatus 1 has a conveying path P1 for conveying the sheet S from the sheet feeder 3 to the sheet discharger 7 via the image forming engine 5.

The sheet feeding tray 30 includes a pressure plate 31 and a pressing plate 311. The pressure plate 31 is a plate-shaped member configure to support the sheet S from below. The pressure plate 31 is configured to pivot about a pivot 31*a* at a rear end thereof and can be moved up and down between a lowered position and a raised position by pivoting about the pivot 31*a*. The pressing plate 311 is located below the pressure plate 31 and is configured to move the pressure plate 31 up and down between the lowered position and the raised position.

The sheet feeding mechanism 32 includes a sheet feeding roller 32*a*, a separation roller 32*b*, and a separation pad 32*c*. The sheet feeding roller 32*a* feeds the sheets S supported by the sheet feeding tray 30 toward the separation roller 32*b*. The separation roller 32*b* is disposed downstream of the sheet feeding roller 32*a* in a sheet conveying direction, and the separation pad 32*c* is disposed to oppose to the separation roller 32*b* and is biased toward the separation roller 32*b*.

The sheets S fed by the sheet feeding roller 32*a* toward the separation roller 32*b* are separated one by one between the separation roller 32*b* and the separation pad 32*c*. The sheets S separated one by one are fed to the conveying path P1.

The sheet S fed to the conveying path P is conveyed toward the image forming engine 5 by the conveying roller pair 33 and the registration roller pair 34. The registration roller pair 34 restricts movement of a leading edge of the conveyed sheet S and temporarily stops the sheet S, and then conveys the sheet S toward the image forming engine 5 at a predetermined timing.

The image forming engine 5 is disposed downstream of the sheet feeder 3 in the sheet conveying direction, and forms an image on the sheet S conveyed from the sheet feeder 3. The image forming engine 5 includes a process cartridge 50 configured to transfer an image onto the surface of the sheet S conveyed from the sheet feeder 3, and an exposure unit 56 configured to expose a surface of a photosensitive drum 54 in the process cartridge 50.

The process cartridge 50 is disposed above the sheet feeder 3 inside the apparatus main body 2 and includes a developer chamber 51, a supply roller 52, a developing roller 53, the photosensitive drum 54, a transfer roller 55, and the like.

The exposure unit 56 includes a laser diode, a polygon mirror, a lens, a reflecting mirror, and the like, and irradiates a laser beam toward the photosensitive drum 54 based on image data input to the image forming apparatus 1, thereby exposing the surface of the photosensitive drum 54.

Toner serving as developer is accommodated in the developer chamber 51. The toner accommodated in the developer chamber 51 is conveyed toward the supply roller 52 while being agitated by a conventionally-known stirring member. The supply roller 52 supplies the toner supplied from the developer chamber 51 to the developing roller 53.

The developing roller 53 is disposed in close contact with the supply roller 52, and carries toner supplied from the supply roller 52 and positively charged by a conventionally-known sliding contact member. A developing bias is applied to the developing roller 53 by a conventionally-known biasing device.

The photosensitive drum 54 is disposed adjacent to the developing roller 53. The surface of the photosensitive drum 54 is uniformly charged by a conventionally-known charger and then exposed to light by the exposure unit 56. The exposed portion of the photosensitive drum 54 has lower potential than the other portion, and an electrostatic latent image based on image data is formed on the photosensitive drum 54. When the positively charged toner is supplied from the developing roller 53 onto the surface of the photosensitive drum 54 on which the electrostatic latent image has been formed, the electrostatic latent image is visualized and becomes a toner image.

The transfer roller 55 is disposed so as to oppose to the photosensitive drum 54, and a transfer bias is applied to the transfer roller 55 by a conventionally-known biasing device. By nipping and conveying the sheet S between the photosensitive drum 54 on which the toner image is formed and the transfer roller 55 in a state where the transfer bias is applied to the surface of the transfer roller 55, the toner image formed on the surface of the photosensitive drum 54 is transferred onto the surface of the sheet S. In other words, the photosensitive drum 54 transfers the toner image onto the sheet S.

The fixing device 6 includes a heating unit 61 and a pressure roller 62, and fixes the toner image transferred onto the sheet S in the image forming engine 5. The heating unit 61 is heated by supplying electrical power from a conventionally-known power source. The pressure roller 62 is disposed so as to oppose to the heating unit 61. One of the heating unit 61 and the pressure roller 62 is biased against the other by a conventionally-known biasing mechanism and thus the heating unit 61 and the pressure roller 62 are in close contact with each other.

When the sheet S onto which the toner image has been transferred is conveyed to the fixing device 6, the sheet S is sandwiched and conveyed between the heating unit 61 and the pressure roller 62 to heat the sheet S and fix the toner image on the sheet S. In other words, the heating unit 61 and the pressure roller 62 fix the toner on the sheet S.

The sheet discharger 7 is located downstream of the fixing device 6 in the sheet conveying direction, and discharges the sheet S on which an image has been formed in the image forming engine 5 to the outside of the image forming apparatus 1, or conveys the sheet S toward the image forming engine 5 again. The sheet discharger 7 includes a sheet discharge roller pair 71 and a sheet discharge tray 72.

A portion of the conveying path P1 downstream of the fixing device 6 is formed as a sheet discharge path P1*a*. The sheet discharge roller pair 71 is configured to discharge the sheet S conveyed along the sheet discharge path P1*a* from the fixing device 6 to the outside of the apparatus main body 2. The sheet discharge tray 72 is formed on an upper surface of the apparatus main body 2 and supports the sheet S discharged to the outside of the apparatus main body 2 by the sheet discharge roller pair 71.

The sheet discharge roller pair 71 is configured to rotate in a sheet discharging direction which is a rotating direction when the sheet S is conveyed toward the sheet discharge tray 72, and in a reconveying direction which is a rotating direction opposite to the sheet discharging direction. The image forming apparatus 1 has a reconveying path P2 configured to guide the sheet S that has been conveyed along the conveying path P1 and passed through the fixing device 6 to the conveying path P1 upstream of the registration roller pair 34 in the sheet conveying direction.

The reconveying path P2 diverges from the sheet discharge path P1*a* at a diverging point Pb located between the fixing device 6 and the sheet discharge roller pair 71, extends forward between the image forming engine 5 and the sheet feeding tray 30, and joins the conveying path P1 at a junction point Pa located between the conveying roller pair 33 and the registration roller pair 34.

The sheet S conveyed from the fixing device 6 to the sheet discharger 7 can be conveyed to the image forming engine 5 again through the reconveying path P2 by rotating the sheet discharge roller pair 71 in the reconveying direction. The sheet S conveyed to the reconveying path P2 by the sheet discharge roller pair 71 is conveyed toward the image forming engine 5 by a first reconveying roller pair 35 and a second reconveying roller pair 36 provided along the reconveying path P2.

The image forming apparatus 1 can perform double-sided printing in which the sheet S on which an image has been formed on one side by the image forming engine 5 is conveyed to the image forming engine 5 again through the reconveying path P2, and an image is formed on the other side of the sheet S.

The sheet discharge sensor 8 is disposed between the fixing device 6 and the sheet discharge roller pair 71 in the sheet conveying direction. The sheet discharge sensor 8 is configured to detect the sheet S having passed through the fixing device 6.

The apparatus main body 2 includes a chute 22 that is disposed downstream of the fixing device 6 in the sheet conveying direction and forms a portion of the sheet discharge path P1*a* being a portion of the conveying path P1 downstream of the fixing device 6 in the sheet conveying direction. The chute 22 is configured to pivot between a path forming position for forming the sheet discharge path P1*a* and a path opening position for opening the sheet discharge path P1*a*.

The chute 22 pivots with the opening and closing of the rear cover 21, and is located at the path forming position when the rear cover 21 is at the closed position and at the path opening position when the rear cover 21 is at the open position.

The apparatus main body 2 includes a reconveying chute 23 that is located below the chute 22 and guides a lower surface of the sheet S conveyed along the reconveying path P2. The apparatus main body 2 includes a main body frame 24 that covers a front side, an upper side, and a rear side of the heating unit 61 of the fixing device 6.

Fixing Device

Figure 2:
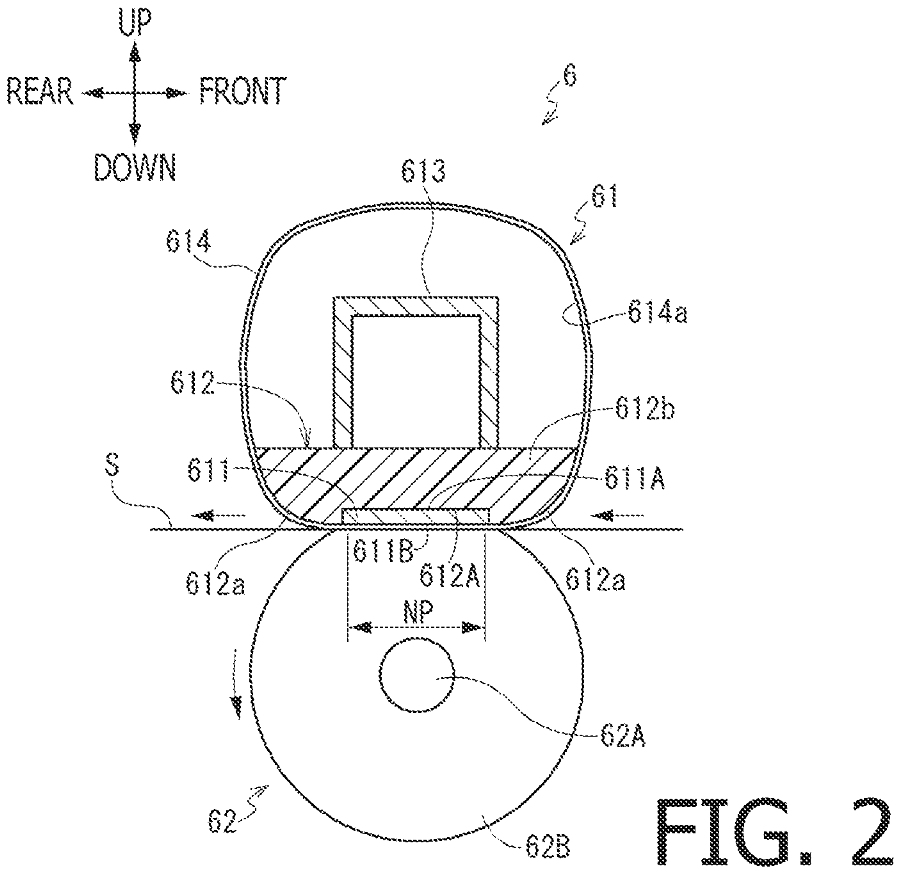
FIG. 2 is a sectional side view of a fixing device.
Figure 3:
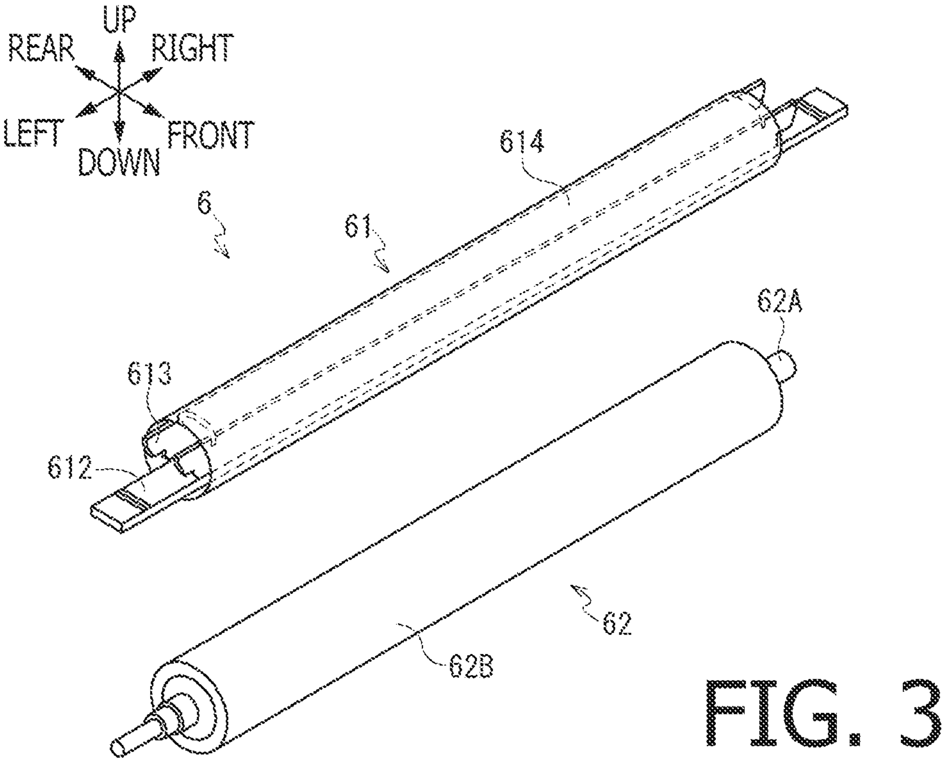
FIG. 3 is a perspective view of a heating unit and a pressure roller of the fixing device.

As shown in FIGS. 2 and 3, the heating unit 61 of the fixing device 6 includes a heater 611, a holder 612, a stay 613, and a belt 614. The heater 611 is a flat plate-shaped heater extending in the left-right direction. The heater 611 has a first surface 611A and a second surface 611B opposite to the first surface 611A. The first surface 611A is supported by the holder 612.

The holder 612 is made of, for example, a resin member, and has a guide surface 612*a* and a support wall 612*b*. The guide surface 612*a* contacts an inner peripheral surface 614*a* of the belt 614 to guide the belt 614. The support wall 612*b* has a support surface 612A configured to support the heater 611. The support surface 612A of the support wall 612*b* contacts a first surface 611A of the heater 611. The stay 613 is a member configured to support the holder 612, and is formed by bending a plate material such as a steel plate having a rigidity greater than that of the holder 612 into a substantially U-shape in cross section.

The belt 614 is an endless belt having heat resistance and flexibility, and has a metal tube made of metal such as stainless steel and a fluorine resin layer covering the metal tube. The heater 611, the holder 612, and the stay 613 are disposed inside the belt 614. The belt 614 is configured to rotate around the heater 611, the holder 612, and the stay 613. The inner peripheral surface 614*a* of the belt 614 contacts the heater 611.

The pressure roller 62 has a metal shaft 62A and an elastic layer 62B covering the shaft 62A. The pressure roller 62 is pressed by the heater 611 via a belt 614. The pressure roller 62 and the heater 611 form a nip portion NP for heating and pressing the sheet S by nipping the belt 614 between the pressure roller 62 and the heater 611. That is, the pressure roller 62 heats and presses the sheet S at the nip portion NP together with the heater 611.

The pressure roller 62 is configured to be rotated by transmission of driving force from a driving source included in the image forming apparatus 1. When the pressure roller 62 is rotated, the belt 614 is driven to rotate by frictional force between the belt 614 or the sheet S nipped at the nip portion NP. The sheet S onto which the toner image has been transferred is conveyed between the pressure roller 62 and the heated belt 614 so that the toner image is thermally fixed.

Figure 4:
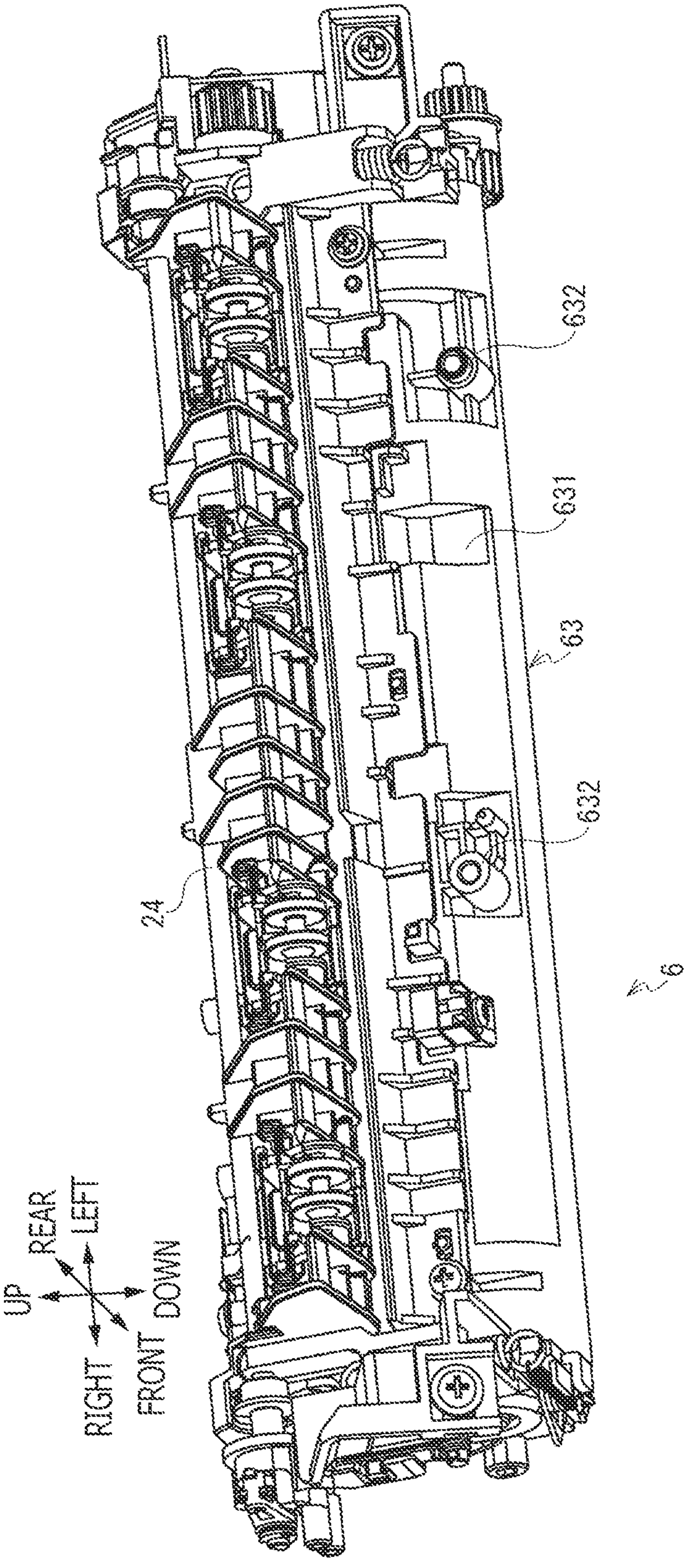
FIG. 4 is a perspective view of the fixing device.
Figure 5:
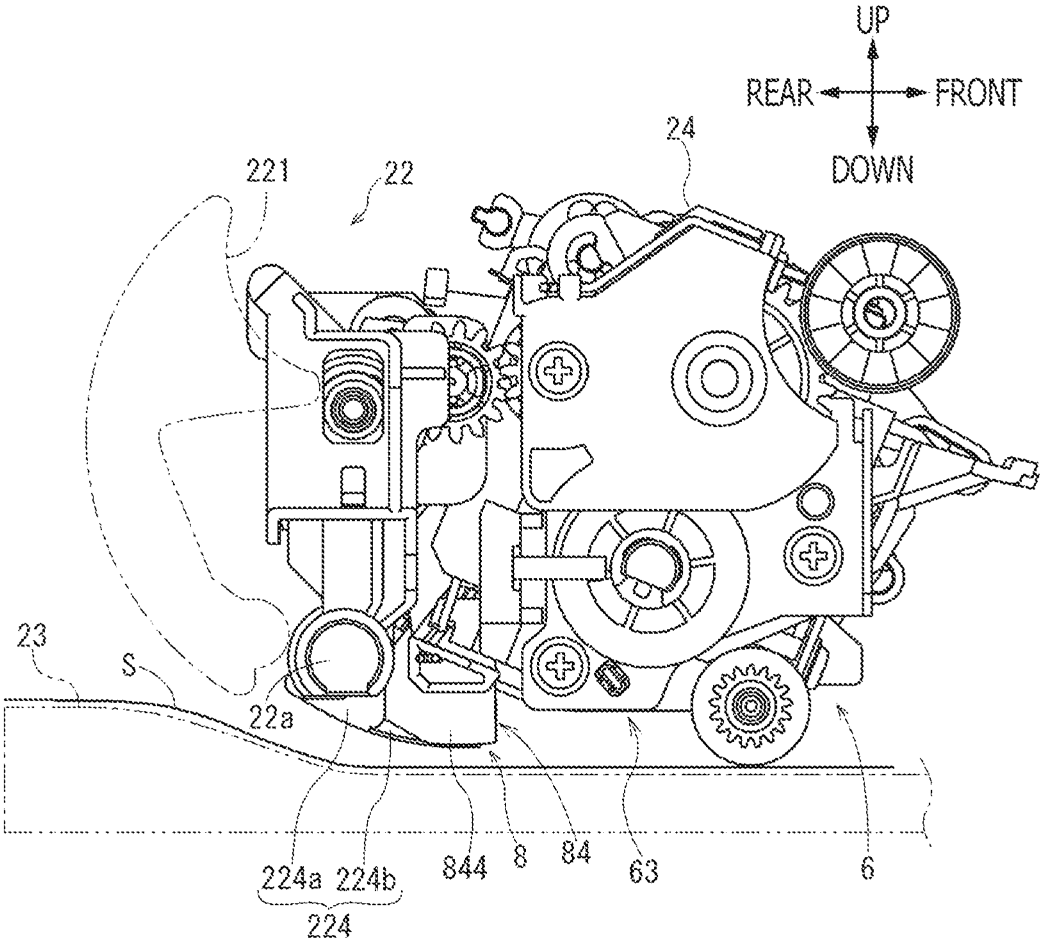
FIG. 5 is a side view of the fixing device, a chute, and a sheet discharge sensor.

As shown in FIGS. 4 and 5, the fixing device 6 includes a fixing device frame 63. The fixing device frame 63 supports the heating unit 61 and the pressure roller 62. The fixing device frame 63 supports the heater 611. The fixing device frame 63 may indirectly support the heater 611 via another member such as the holder 612 or may directly support the heater 611. The main body frame 24 is located above the fixing device frame 63.

In the present embodiment, the fixing device 6 includes the heating unit 61 having the heater 611 and the belt 614 and the pressure roller 62. However, the fixing device 6 may include a heating roller having a heater built therein and a pressure roller pressed by the heating roller. Alternatively, the fixing device 6 may include a heating roller having a heater built therein and a pressure belt pressed against the heating roller by an elastic member.

Chute

As shown in FIG. 5 to FIG. 8C and FIGS. 13A to 13C, the chute 22 is configured to pivot in the front-rear direction rear direction about pivot shaft parts 22*a*, and can be located at the path forming position (the position shown in FIGS. 8A to 8C) by pivoting forward and at the path opening position (the position shown in FIGS. 13A to 13C) by pivoting backward. The chute 22 includes a guide surface 221, a cover 222, an anti-pivot rib 223, and guide ribs 224.

The guide surface 221 is located downstream of the fixing device 6 in the sheet conveying direction, forms a portion of the conveying path P1 when the chute 22 is at the path forming position, and opens the conveying path P1 when the chute 22 is at the path opening position.

The cover 222 is formed of a plate-shaped member extending in the left-right direction. The cover 222 has a main body part 222*a* facing the front-rear direction and extended parts 222*b* extending forward from a lower end of the main body part 222*a*.

The anti-pivot rib 223 is a rib member projecting forward from approximately the central portion of the main body part 222*a* of the cover 222 in the left-right direction, and has an abutting surface 223*a* at a front end thereof.

The guide ribs 224 are rib members extending in the sheet conveying direction of the sheet S conveyed along the reconveying path P2, and projects downward and forward from a lower end portion of the cover 222. The guide ribs 224 face the reconveying chute 23 in the up-down direction and guides an upper surface of the sheet S conveyed along the reconveying path P2. A plurality of guide ribs 224 are arranged at intervals in the left-right direction.

Figure 6:
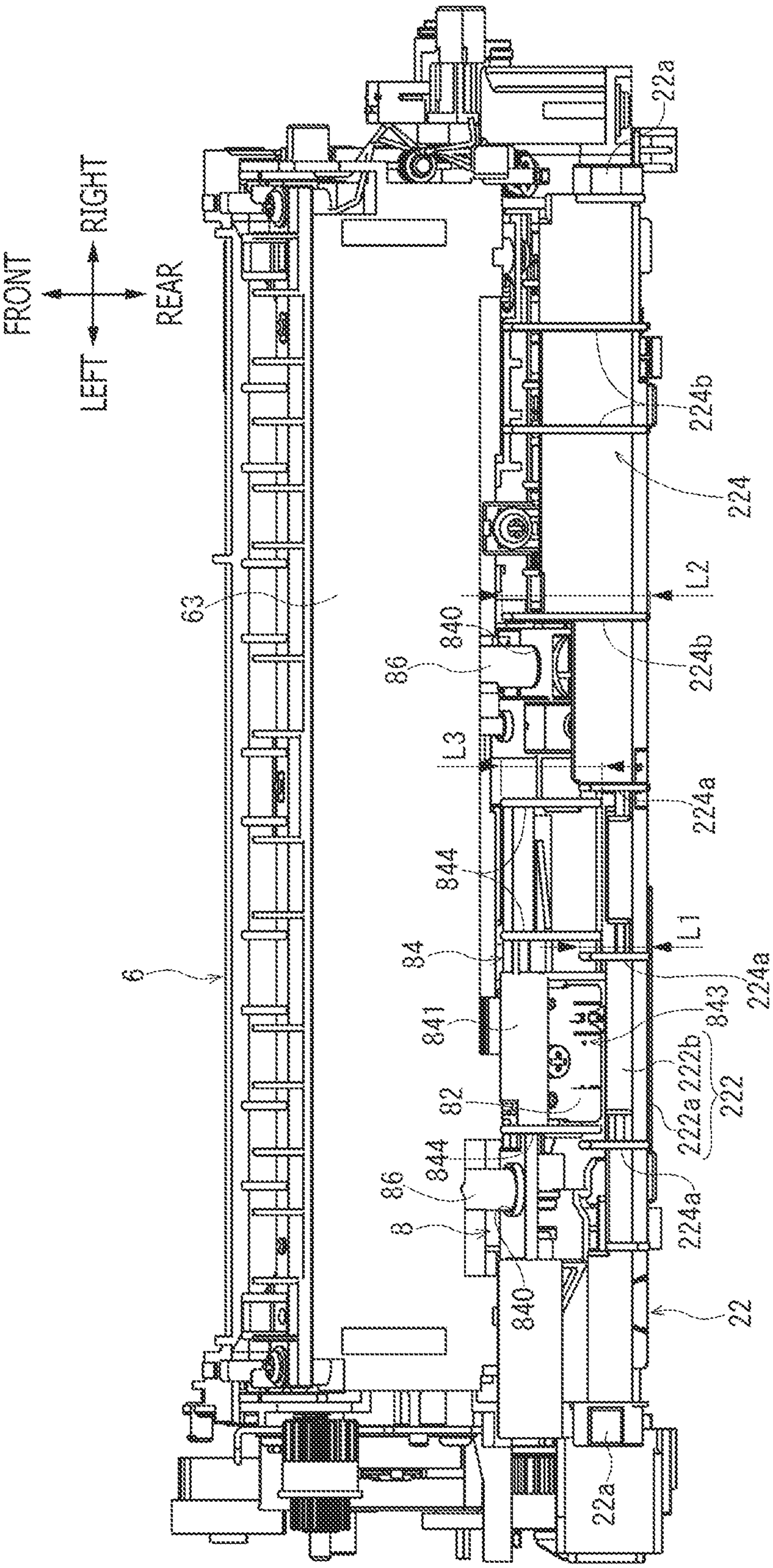
FIG. 6 is a bottom view of the fixing device, the chute, and the sheet discharge sensor.
Figure 7A:
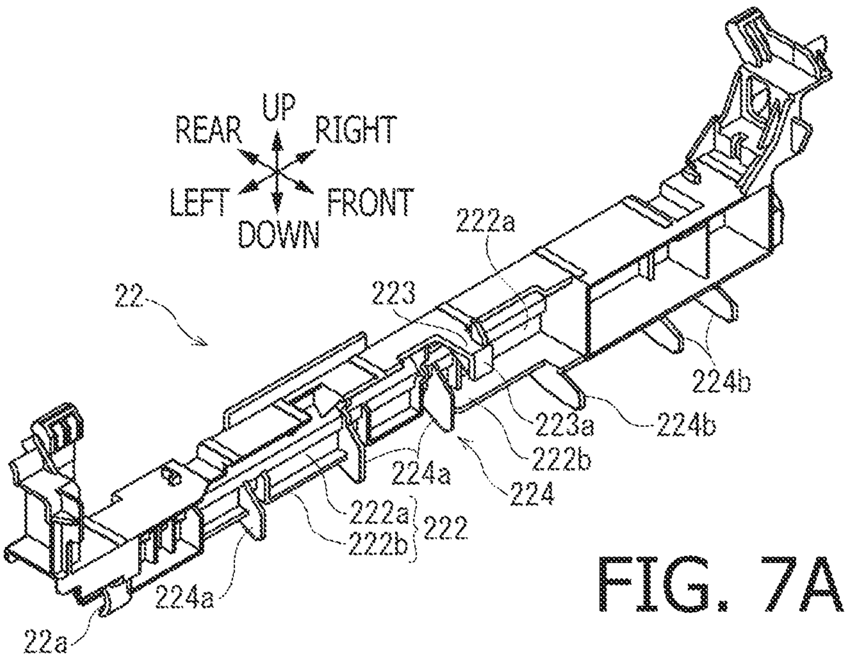
FIG. 7A is a perspective view of the chute.
Figure 7B:
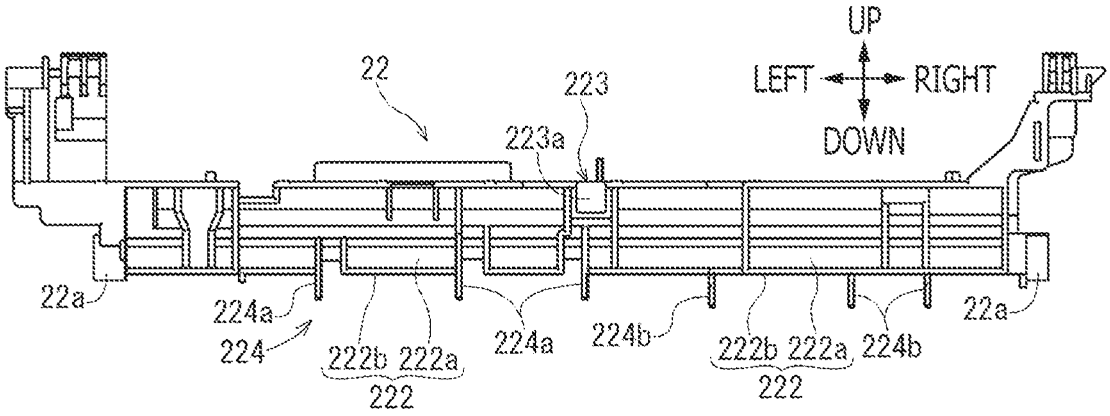
FIG. 7B is a front view of the chute.
Figure 7C:
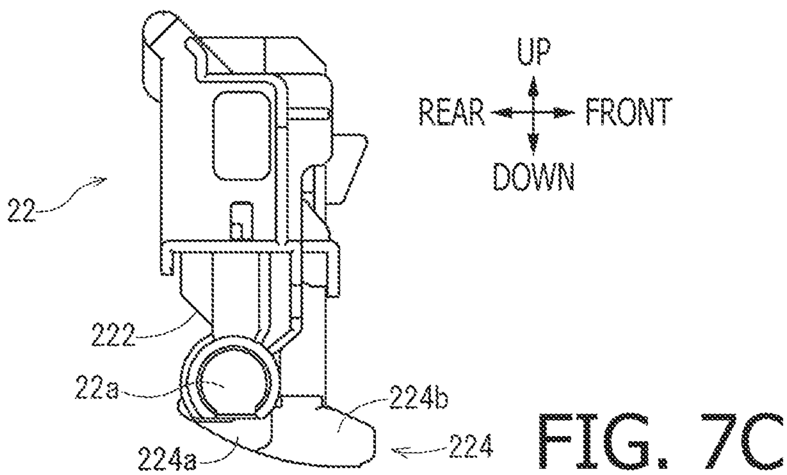
FIG. 7C is a side view of the chute.

The guide ribs 224 include first guide ribs 224*a* and second guide ribs 224*b*. The first guide ribs 224*a* are disposed at approximately the central portion in the left-right direction, and the second guide ribs 224*b* are disposed on the right side of the first guide ribs 224*a*. As shown in FIG. 6, a length L1 of the first guide ribs 224*a* in the sheet conveying direction is shorter than a length L2 of the second guide ribs 224*b* in the sheet conveying direction.

Sheet Discharge Sensor

As shown in FIGS. 8A to 9C, the sheet discharge sensor 8 includes an optical sensor 81, a substrate 82, an actuator 83, and a support frame 84.

The optical sensor 81 includes a light-emitting element 811 configured to emit light and a light-receiving element 812 configured to receive light emitted from the light-emitting element 811. The optical sensor 81 is on when the light-receiving element 812 is receiving light emitted from the light-emitting element 811 and is off when the light-receiving element 812 is not receiving light emitted from the light-emitting element 811.

The optical sensor 81 is mounted on the substrate 82. The substrate 82 is mounted on the support frame 84. When the substrate 82 is mounted on the support frame 84, the optical sensor 81 is supported by the support frame 84.

Figure 10A:
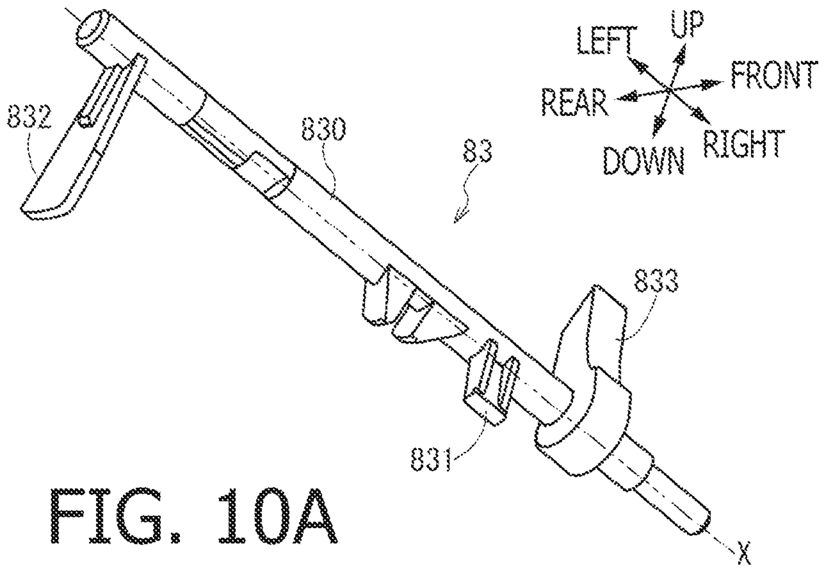
FIG. 10A is a perspective view of the actuator.
Figure 10B:
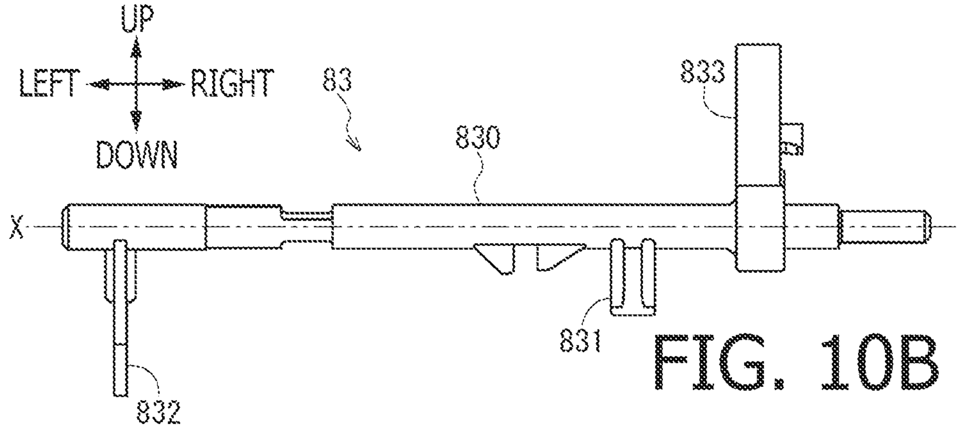
FIG. 10B is a front view of the actuator.
Figure 10C:
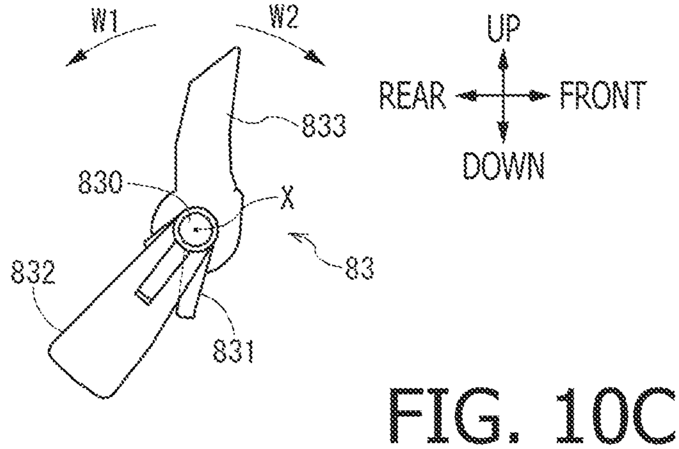
FIG. 10C is a side view of the actuator.

As shown in FIGS. 10A to 10C, the actuator 83 includes a shaft 830, a first lever 831, a second lever 832, and a third lever 833. The shaft 830 is a shaft member extending in the left-right direction. The shaft 830 is supported by the support frame 84 so as to be rotatable in a first direction W1 and a second direction W2 opposite to the first direction W1 about an axis X extending in the left-right direction. The shaft 830 is located below the conveying path P1.

The first lever 831 projects from the shaft 830 in a direction perpendicular to the axis X. The first lever 831 projects downward from the shaft 830. The first lever 831 is configured to contact the anti-pivot rib 223 of the chute 22.

The second lever 832 projects from the shaft 830 in a direction perpendicular to the axis X. The second lever 832 projects downward from the shaft 830. The second lever 832 is configured to shield light emitted from the light-emitting element 811 of the optical sensor 81. The second lever 832 is positioned on the left side of the first lever 831 in a direction of the axis X.

The third lever 833 projects from the shaft 830 in a direction perpendicular to the axis X. The third lever 833 projects upward from the shaft 830. The third lever 833 is located on the right side of the first lever 831 in the direction of the axis X. The third lever 833 is disposed on the conveying path P1 and is configured to abut against the sheet S conveyed along the conveying path P1.

When the conveyed sheet S comes into contact with the third lever 833 disposed on the conveying path P1, the actuator 83 pivots about the axis X in a direction in which the third lever 833 retracts below the conveying path P1. The third lever 833 is biased by a spring 85 (see FIG. 9B) in a direction in which the third lever 833 retracted below the conveying path P1 pivots toward the position on the conveying path P1.

A pivoting direction of the actuator 83 in which the third lever 833 pivots from the position on the conveying path P1 to the position retracted below the conveying path P1 is the first direction W1. The pivoting direction of the actuator 83 in which the third lever 833 pivots from the position retracted below the conveying path P1 to the position on the conveying path P1 is the second direction W2.

Figure 11:
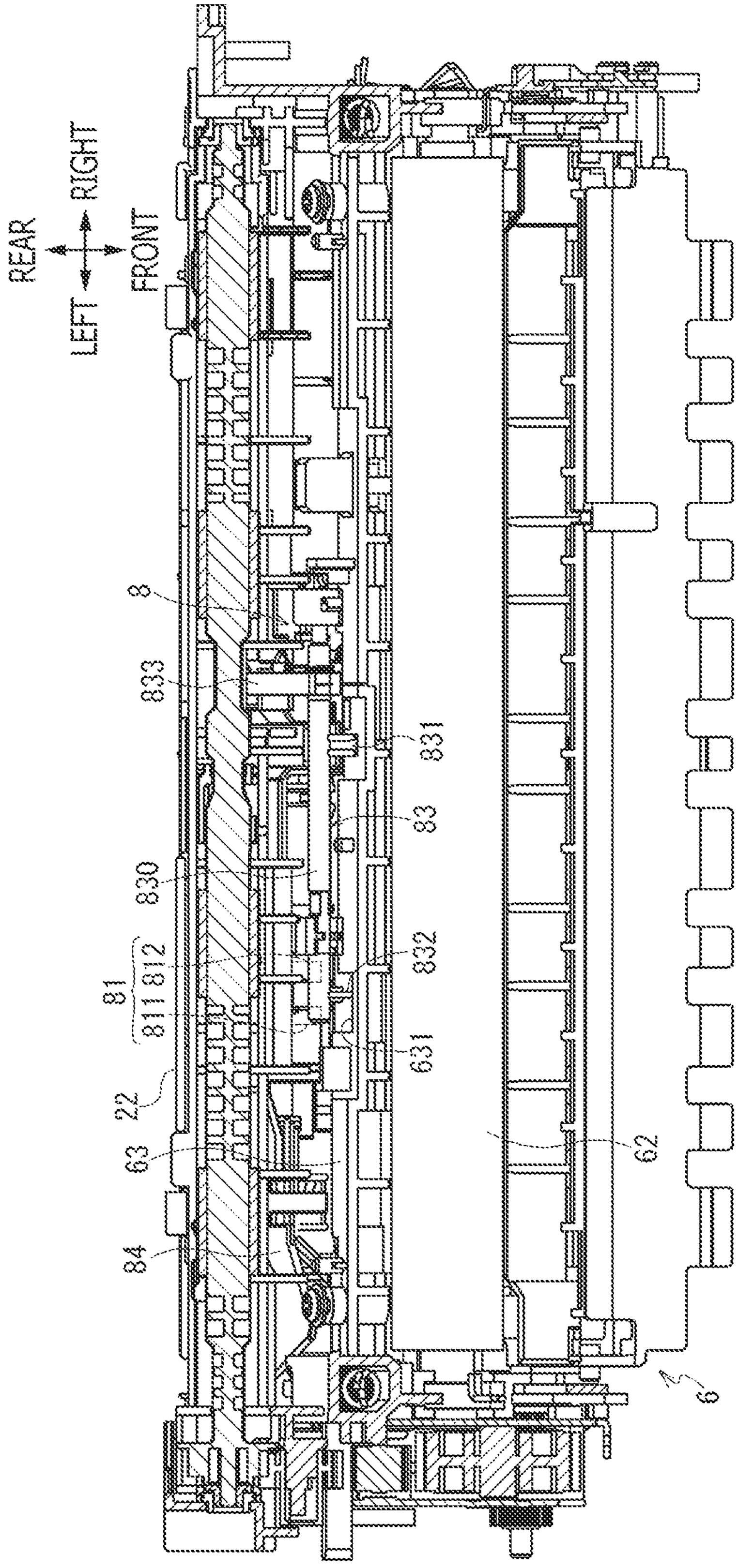
FIG. 11 is a plan view of the fixing device, the chute, and the sheet discharge sensor.

As shown in FIG. 11, the actuator 83 and the optical sensor 81 are located at approximately the central portion in the left-right direction of the apparatus main body 2, and the actuator 83 does not extend to the left and right ends of the apparatus main body 2.

As shown in FIGS. 8A to 9C, the support frame 84 is a frame member extending in the left-right direction, and supports the optical sensor 81 mounted on the substrate 82 and the actuator 83. The support frame 84 supports the optical sensor 81 and the actuator 83, thereby forming a unitized sheet discharge sensor 8.

The support frame 84 has fixing holes 840 for inserting screws 86, and the support frame 84 is attached to the fixing device frame 63 by screwing the screws 86 inserted into the fixing holes 840 into bosses 632 (see FIG. 4) of the fixing device frame 63. The actuator 83 and the optical sensor 81 are attached to the fixing device frame 63 via the support frame 84.

The support frame 84 includes an upstream frame 841, a downstream frame 842, and an opening 843. The upstream frame 841, the downstream frame 842, and the opening 843 are disposed at a portion in the left-right direction where the substrate 82 on which the optical sensor 81 is mounted and the second lever 832 of the actuator 83 are located.

The upstream frame 841 is disposed upstream of the support frame 84 in the sheet conveying direction. The upstream frame 841 is disposed between the fixing device frame 63 and the actuator 83 and between the fixing device frame 63 and the optical sensor 81 in the sheet conveying direction. By interposing the upstream frame 841 between the fixing device frame 63 and the actuator 83 and between the fixing device frame 63 and the optical sensor 81, the upstream frame 841 can block heat from the heating unit 61 of the fixing device 6, thereby reducing influence of heat on the actuator 83 and the optical sensor 81.

The downstream frame 842 is disposed on the opposite side of the actuator 83 to the upstream frame 841 in the sheet conveying direction. That is, the optical sensor 81, the substrate 82 and the actuator 83 are located between the upstream frame 841 and the downstream frame 842 in the sheet conveying direction.

The opening 843 is opened between the upstream frame 841 and the downstream frame 842 in the sheet conveying direction on a side toward which the second lever 832 extends from the shaft 830 with respect to the actuator 83, that is, at a position obliquely rearward and downward with respect to the actuator 83. The opening 843 communicates with outside of the support frame 84. The substrate 82 is exposed to the outside through the opening 843 of the upstream frame 841.

On the other hand, the opening 843 of the support frame 84 is covered by the cover 222 of the chute 22 positioned at the path forming position. That is, the cover 222 closes the opening 843 of the support frame 84 when the chute 22 is positioned at the path forming position.

As described above, although the substrate 82 is exposed to the outside through the opening 843, the opening 843 is closed by the cover 222 of the chute 22. As a result, it is possible to suppress entering of external light in the support frame 84 from the opening 843 by the cover 222, and thus it is possible to reduce malfunction of the optical sensor 81 mounted on the substrate 82.

The support frame 84 has conveying ribs 844. The conveying ribs 844 project lower than the upstream frame 841 and are arranged at intervals in the left-right direction. As shown in FIG. 5, the conveying ribs 844 face the reconveying chute 23 in the up-down direction and guide the upper surface of the sheet S conveyed along the reconveying path P2.

Figure 8A:
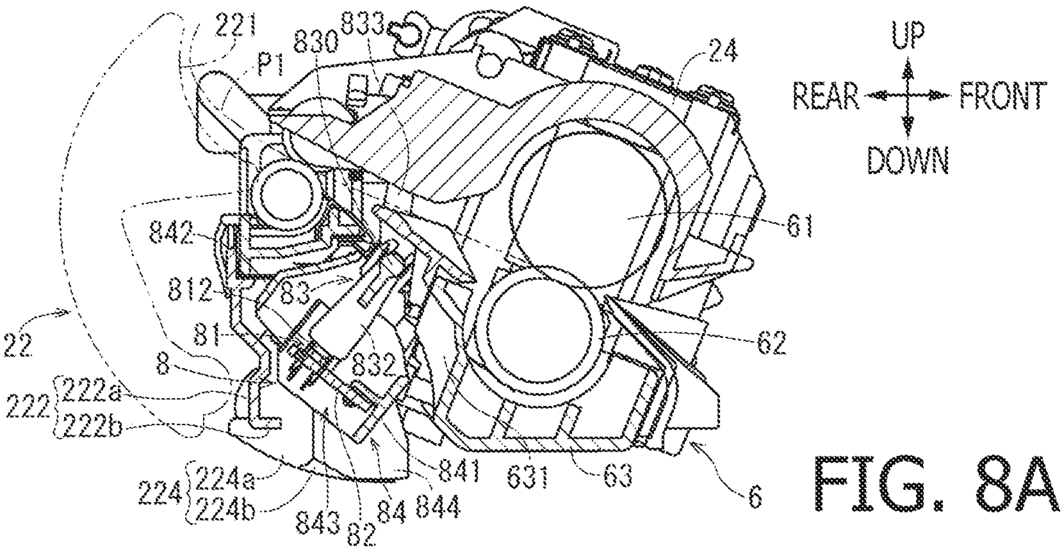
FIG. 8A is a sectional side view of the sheet discharge sensor in a state where an actuator is at a first position.

As shown in FIGS. 5, 6, and 8A, the conveying ribs 844 are located in front of the first guide ribs 224*a* of the chute 22. The conveying ribs 844 are disposed adjacent to the first guide ribs 224*a* in the left-right direction and guides the sheet S conveyed along the reconveying path P2 together with the first guide ribs 224*a*. The second guide ribs 224*b* of the chute 22 are disposed farther from the conveying ribs 844 than the first guide ribs 224*a* in the left-right direction.

A length L3 (see FIG. 6) of the conveying ribs 844 in the sheet conveying direction is shorter than the length L2 of the second guide ribs 224*b* of the chute 22. That is, both the length L1 of the first guide ribs 224*a* and the length L3 of the conveying ribs 844 are shorter than the length L2 of the second guide ribs 224*b*. However, as shown in FIG. 6, the first guide ribs 224*a* and the conveying ribs 844 are arranged such that a length from upstream ends of the first guide ribs 224*a* in the sheet conveying direction to downstream ends of the conveying ribs 844 in the sheet conveying direction is substantially the same as the length L2 of the second guide ribs 224*b*. Furthermore, the adjacent first guide rib 224*a* and conveying rib 844 are arranged to partially overlap in the left-right direction. Therefore, by guiding the sheet S with the conveying ribs 844 and the first guide ribs 224*a*, the sheet S can be guided continuously over the length that is substantially the same as the length L2 of the second guide ribs 224*b*, that is, in the same manner as by the second guide ribs 224*b*. Furthermore, the chute 22 can be downsized by making the length L1 of the first guide ribs 224*a* shorter than the length L2 of the second guide ribs 224*b*.

Furthermore, since the support frame 84 is provided with the conveying ribs 844 configured to guide the sheet S conveyed along the reconveying path P2, the support frame 84 can also serve as the ribs for guiding the sheet S, and thus the number of parts can be reduced.

Operation of Actuator

The actuator 83 can move to a first position, a second position, and a third position by pivoting about the axis X.

Figure 8B:
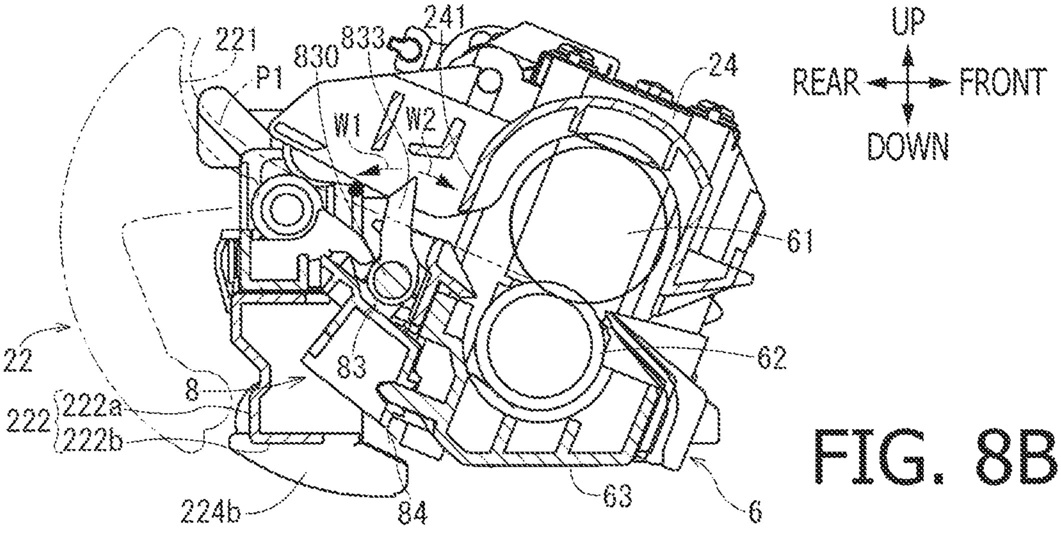
FIG. 8B is another sectional side view of the sheet discharge sensor in a state where the actuator is at the first position.
Figure 8C:
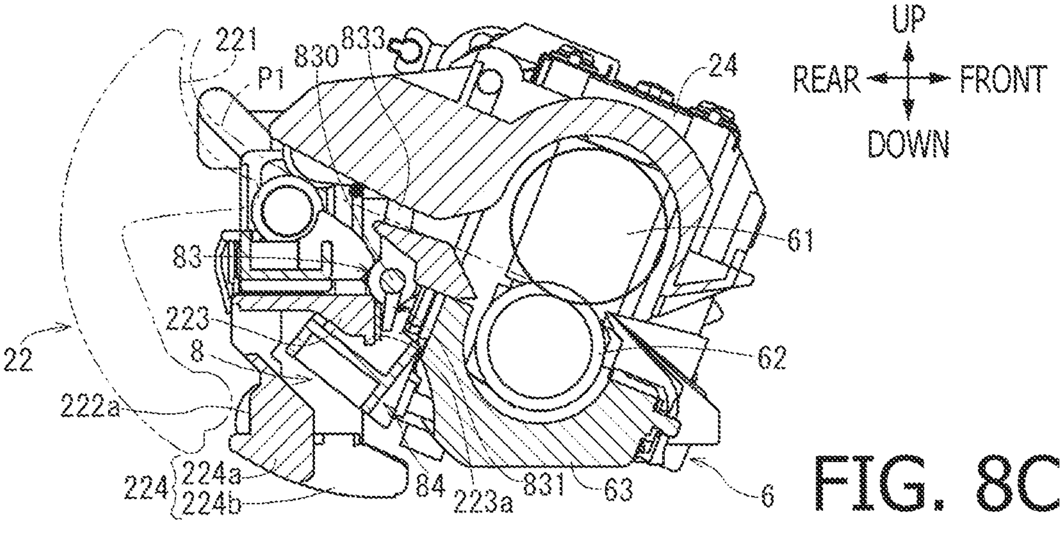
FIG. 8C is another sectional side view of the sheet discharge sensor in a state where the actuator is at the first position.
Figure 9A:
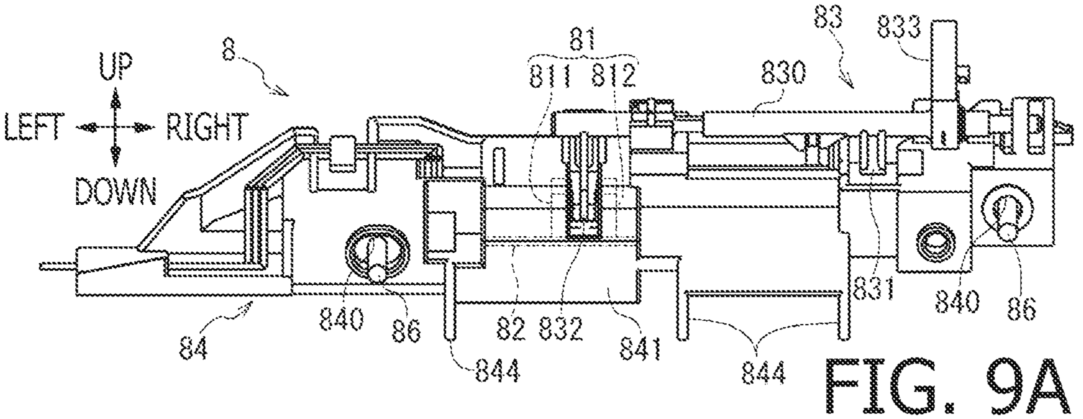
FIG. 9A is a front view of the sheet discharge sensor.
Figure 9B:
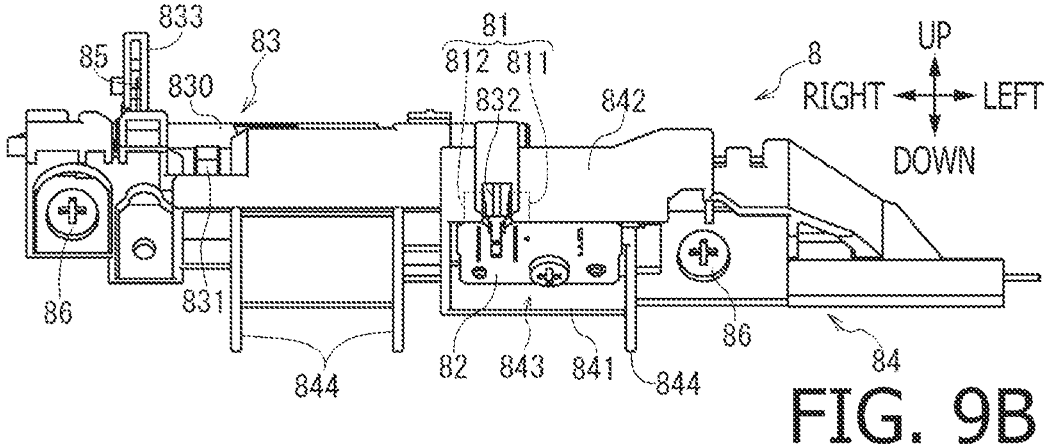
FIG. 9B is a rear view of the sheet discharge sensor.
Figure 9C:
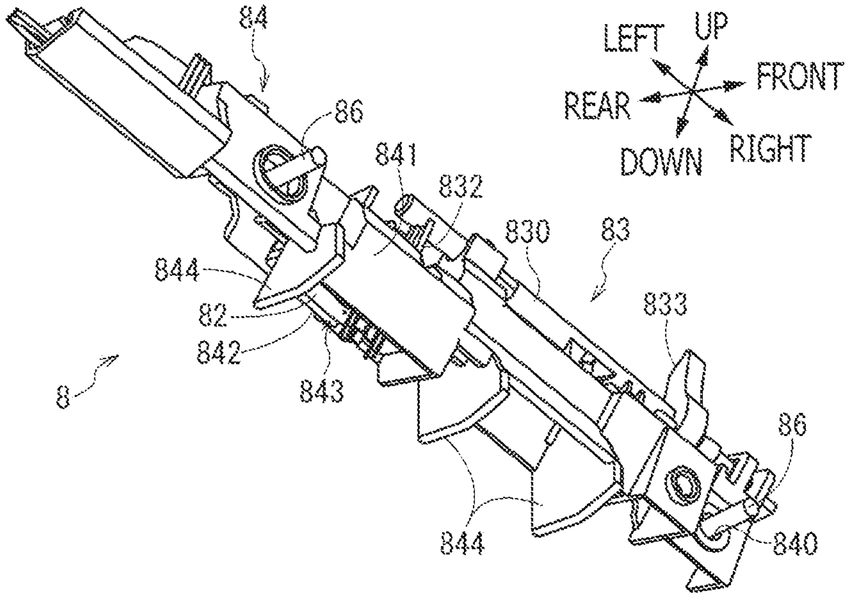
FIG. 9C is a perspective view of the chute.

As shown in FIGS. 8A to 8C, the first position is a position where the first lever 831 of the actuator 83 contacts the abutting surface 223*a* of the anti-pivot rib 223 in a state where the chute 22 is at the path forming position.

When the actuator 83 is at the first position, the second lever 832 is interposed between the light-emitting element 811 and the light-receiving element 812, and the light emitted from the light-emitting element 811 is shielded by the second lever 832 (see FIG. 8A). Since the light from the light-emitting element 811 is shielded by the second lever 832, the light-receiving element 812 does not receive the light, and thus the optical sensor 81 is off.

When the actuator 83 is at the first position, the third lever 833 is disposed on the conveying path P1 (see FIG. 8B). When the third lever 833 is disposed on the conveying path P1 and the sheet S is conveyed to downstream of the fixing device 6 in the sheet conveying direction, the sheet S comes into contact with the third lever 833.

In a state where the actuator 83 is at the first position and the first lever 831 is in contact with the anti-pivot rib 223, the pivot of the actuator 83 in the second direction W2 is restricted by the anti-pivot rib 223 (see FIG. 8C). The pivoting of the actuator 83 at the first position in the first direction W1 is not restricted.

Figure 12A:
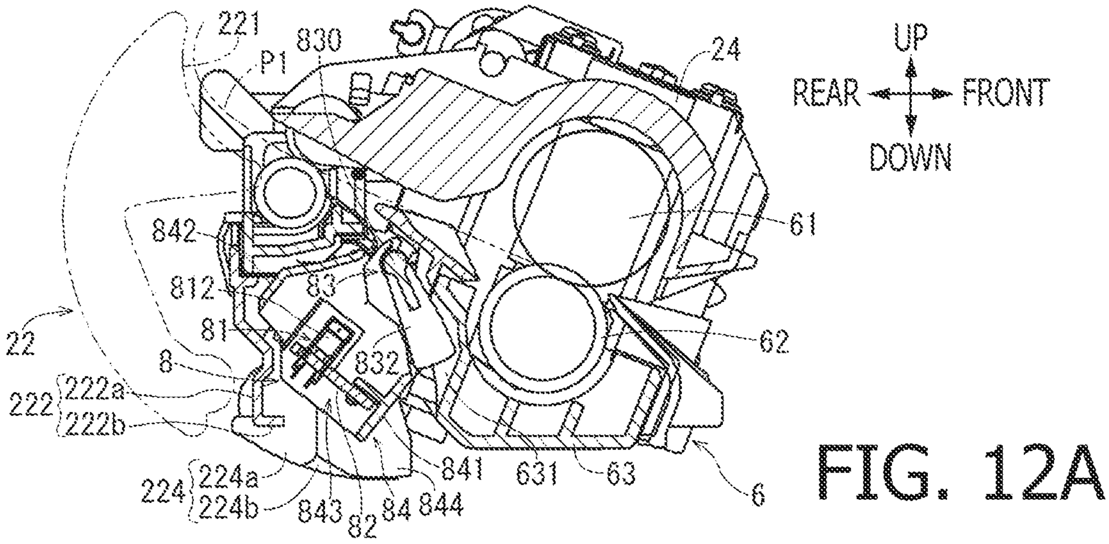
FIG. 12A is a sectional side view of the sheet discharge sensor in a state where the actuator is at a second position.
Figure 12B:
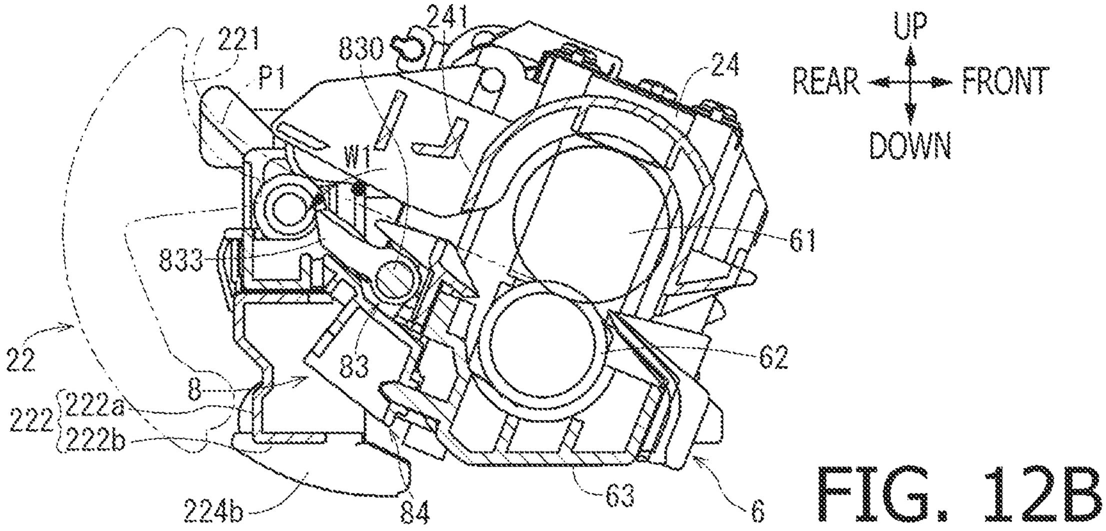
FIG. 12B is another sectional side view of the sheet discharge sensor in a state where the actuator is at the second position.
Figure 12C:
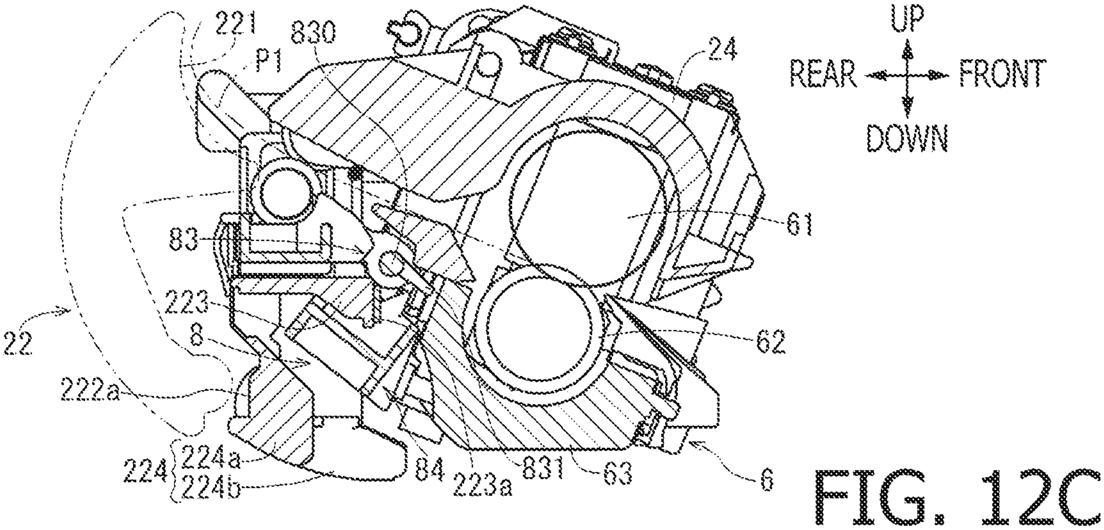
FIG. 12C is another sectional side view of the sheet discharge sensor in a state where the actuator is at the second position.

As shown in FIGS. 12A to 12C, the second position is a position where the first lever 831 and the anti-pivot rib 223 are separated from each other in a state where the chute 22 is at the path forming position. The actuator 83 at the first position pivots in the first direction W1 to the second position when the sheet S conveyed along the conveying path P1 abuts on the third lever 833 in a state where the chute 22 is located at the path forming position.

When the actuator 83 is moved to the second position, the second lever 832 is moved forward and retracted from between the light-emitting element 811 and the light-receiving element 812, and thus the light emitted from the light-emitting element 811 is received by the light-receiving element 812 without being shielded by the second lever 832 (see FIG. 12A). Thus, the optical sensor 81 is turned on. The image forming apparatus 1 can detect that the sheet S has been conveyed to downstream of the fixing device 6 in the sheet conveying direction by detecting, for example, that the chute 22 is at the path forming position and that the optical sensor 81 is turned on.

As shown in FIG. 4 and FIG. 12A, the fixing device frame 63 is formed in a forwardly recessed shape and has a recess 631 that does not interfere with the second lever 832 when the actuator 83 is at the second position. That is, by configuring such that, when the actuator 83 is moved to the second position, the second lever 832 that moved forward is positioned in the recess 631, the second lever 832 and the fixing device frame 63 can be prevented from interfering with each other. Therefore, the actuator 83 and the fixing device frame 63 can be disposed close to each other in the front-rear direction and thus space inside of the apparatus main body 2 occupied by the actuator 83 and the fixing device frame 63 can be reduced. As a result, downsizing of the apparatus main body 2 can be achieved.

When the actuator 83 is at the second position, the third lever 833 is retracted below the conveying path P1 (see FIG. 12B). When the actuator 83 is at the second position, the first lever 831 is separated from the anti-pivot rib 223 in the forward direction (see FIG. 12C).

Figure 13A:
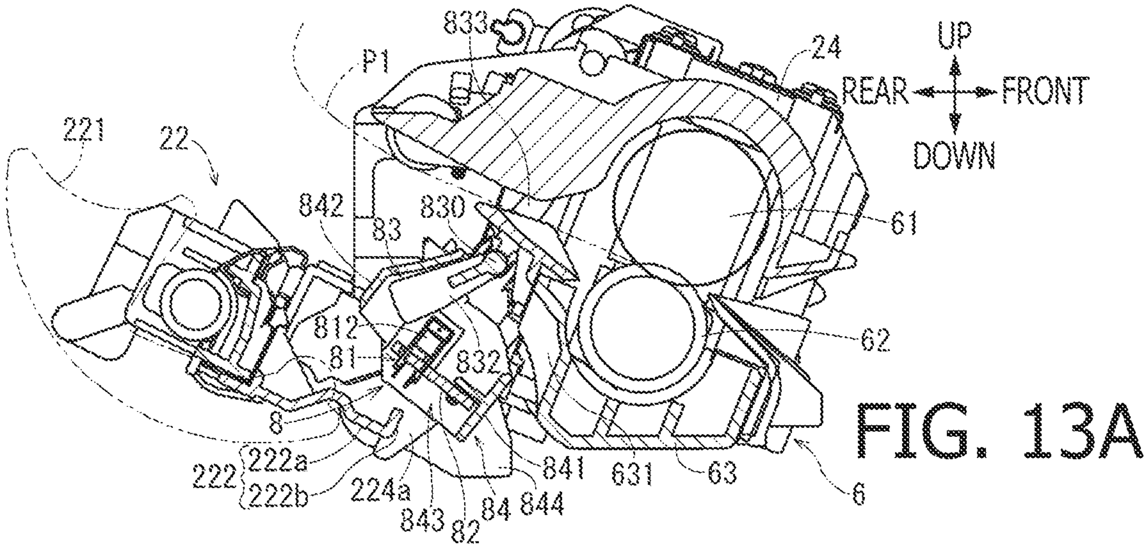
FIG. 13A is a sectional side view of the sheet discharge sensor in a state where the actuator is at a third position.
Figure 13B:
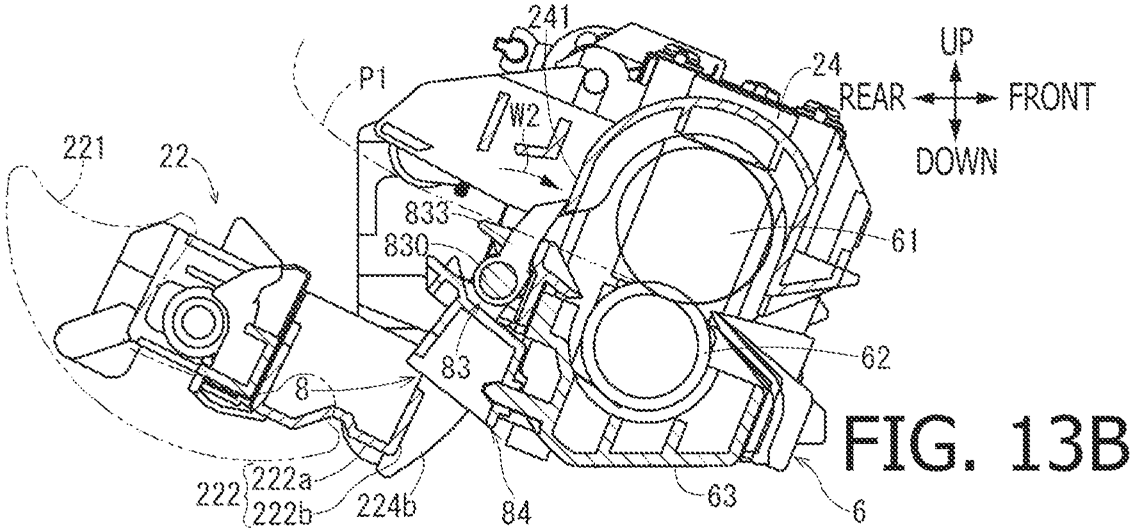
FIG. 13B is another sectional side view of the sheet discharge sensor in a state where the actuator is at the third position.
Figure 13C:
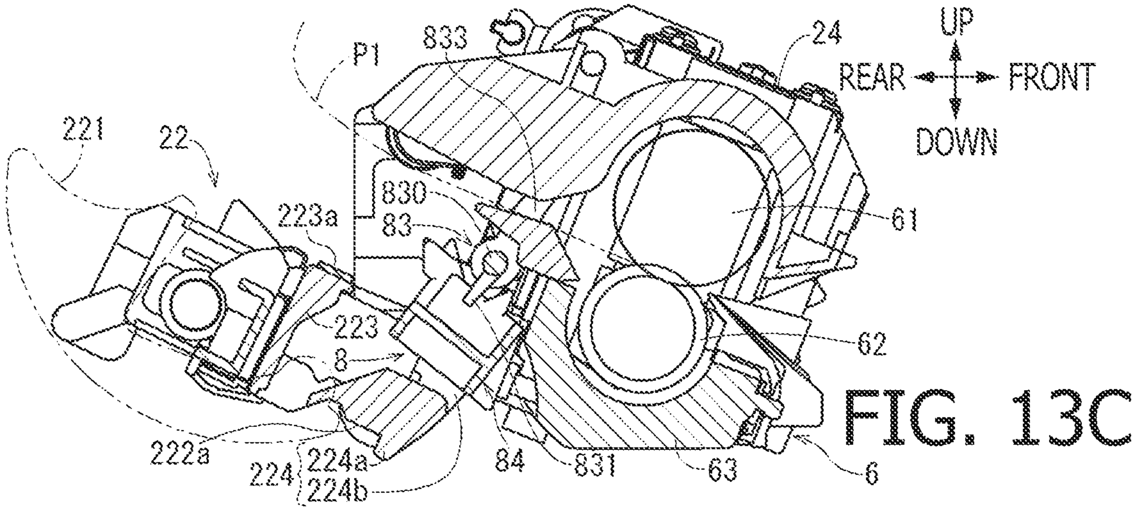
FIG. 13C is another sectional side view of the sheet discharge sensor in a state where the actuator is at the third position.

As shown in FIGS. 13A to 13C, the third position is a position where the first lever 831 and the anti-pivot rib 223 are separated from each other in a state where the chute 22 is at the path opening position. The actuator 83 at the first position moves to the third position by rotating from the first position in the second direction W2 by the biasing force of the spring 85 in a state where the chute 22 is at the path opening position and the second lever 832 and the anti-pivot rib 223 are separated from each other.

When the actuator 83 is moved to the third position, the second lever 832 is moved backward and is retracted from between the light-emitting element 811 and the light-receiving element 812, and thus the light emitted from the light-emitting element 811 is received by the light-receiving element 812 without being shielded by the second lever 832 (see FIG. 13A). The optical sensor 81 is thereby turned on. The image forming apparatus 1 can detect that the rear cover 21 has been moved to the open position by detecting, for example, that the chute 22 is in the path opening position and that the optical sensor 81 is turned on.

When the actuator 83 is at the third position, the third lever 833 is on the conveying path P1 (see FIG. 13B). The position of the third lever 833 when the actuator 83 is at the third position is forward of the position of the third lever 833 when the actuator 83 is at the first position.

As shown in FIG. 13B, the main body frame 24 is provided with a restricting wall 241 that abuts against the third lever 833 when the actuator 83 is moved to the third position. The restricting wall 241 abuts against the third lever 833 when the actuator 83 moves from the first position to the third position, thereby restricting the pivoting of the actuator 83 in the second direction W.

By restricting the pivoting of the third lever 833 in the second direction W2 when the actuator 83 is at the third position, it is possible to suppress moving of the third lever 833 beyond the third position in the second direction W2, and the anti-pivot rib 223 and the first lever 831 not coming in contacting with each other when the chute 22 at the path opening position is pivoted to the path forming position.

When the actuator 83 is at the third position, the chute 22 is at the path opening position, the anti-pivot rib 223 is spaced rearward from the first lever 831 (see FIG. 13C).

In the image forming apparatus 1, both the actuator 83 movable to the first position, the second position, and the third position and the optical sensor 81 are attached to the fixing device frame 63 so that the actuator 83 and the optical sensor 81 can be disposed at the central portion in the width direction of the apparatus main body 2, and thus interference with components such as gears disposed at the end portions in the width direction of the apparatus main body 2 can be suppressed. Furthermore, since attachment position tolerance between the actuator 83 and the optical sensor 81 can be reduced, the optical sensor 81 having a small gap between the light-emitting element 811 and the light-receiving element 812 can be used.

As a result, even when the fixing device 6 grows in size due to, for example, configuring the heating unit 61 of the fixing device 6 to include the flat plate-shaped heater 611, the actuator 83 and the optical sensor 81 can be arranged while preventing or suppressing increase in size of the apparatus main body 2 as compared with the conventional apparatus in which the actuator is provided to the chute and the sensor is provided to the apparatus main body.

Further, by supporting the actuator 83 and the optical sensor 81 with the fixing device frame 63 and providing the anti-pivot rib 223 to the chute 22, the actuator 83 can be downsized, and even when the fixing device 6 grows in size, the actuator 83 and the optical sensor 81 can be arranged while preventing or suppressing increase in size of the apparatus main body 2.

Further, since the actuator 83 is configured to move to the second position by rotating in the first direction W1 and to move to the third position by rotating in the second direction W2, the anti-pivot rib 223 provided to the chute 22 can be configured to have a simple structure.

Further, since the actuator 83 and the optical sensor 81 are supported by the support frame 84 to form a unit and are attached to the fixing device frame 63, the actuator 83 and the optical sensor 81 can be downsized and can be disposed at the central portion in the left-right direction of the apparatus main body 2. When replacing the heating unit 61 and the pressure roller 62, the actuator 83 and the optical sensor 81 supported by the support frame 84 can be easily detached from the fixing device frame 63, and thus the actuator 83 and the optical sensor 81 can be reused.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification of Chute and Sheet Discharge Sensor

Figure 14A:
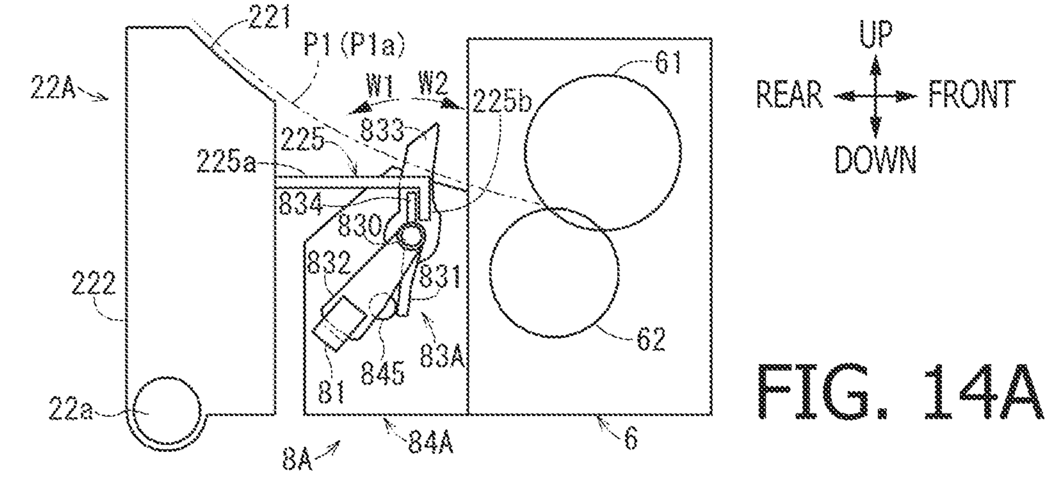
FIG. 14A is a side view of a modified chute and sheet discharge sensor in a state where the actuator is at the first position.
Figure 14B:
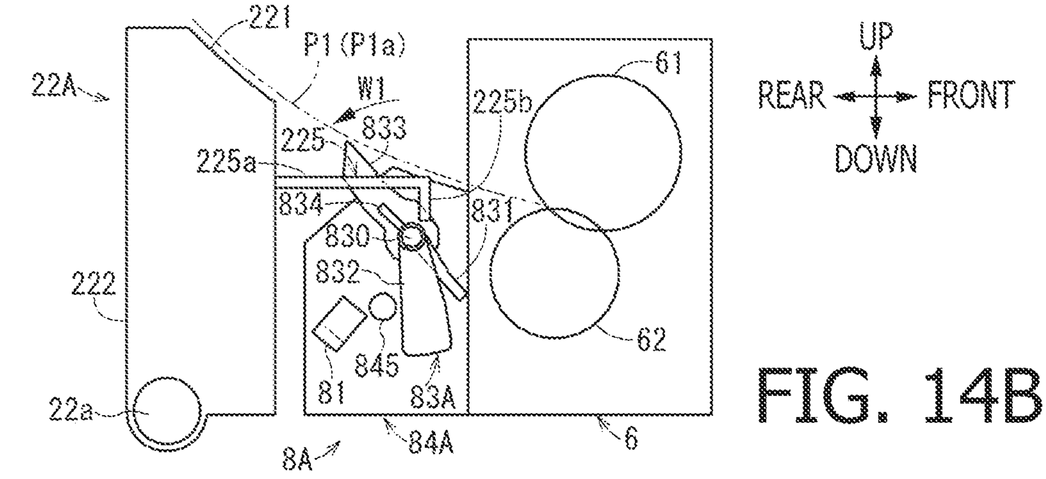
FIG. 14B is a side view of the modified chute and sheet discharge sensor in a state where the actuator is at the second position.
Figure 14C:
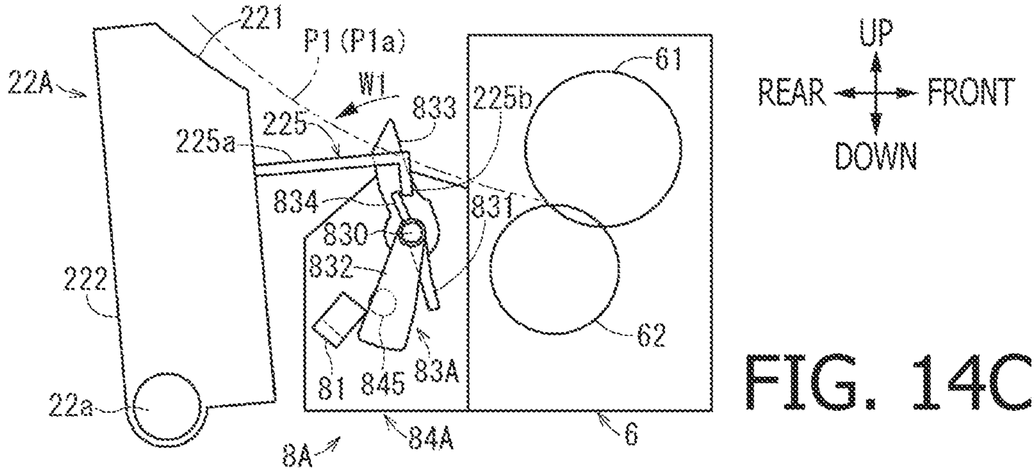
FIG. 14C is a side view of the modified chute and sheet discharge sensor in a state where the actuator is at the third position.

Instead of the configuration including the chute 22 and the sheet discharge sensor 8, the image forming apparatus 1 may include a chute 22A and a sheet discharge sensor 8A shown in FIGS. 14A to 14C.

The chute 22A differs from the chute 22 in that the chute 22A is not provided with the anti-pivot rib 223 but is provided with a pressing arm 225. Since the rest of the configuration of the chute 22A is the same as that of the chute 22, description thereof is herein omitted.

The sheet discharge sensor 8A differs from the sheet discharge sensor 8 in that an actuator 83A is provided in place of the actuator 83, and a support frame 84A is provided in place of the support frame 84. Since the other configuration of the sheet discharge sensor 8A is the same as that of the sheet discharge sensor 8, description thereof is herein omitted.

The actuator 83A differs from the actuator 83 in that the actuator 83A includes a fourth lever 834. Since the other configuration of the actuator 83A is the same as that of the actuator 83, description thereof is herein omitted.

The support frame 84A differs from the support frame 84 in that the support frame 84A includes an anti-pivot rib 845. Since the other configuration of the support frame 84A is the same as that of the support frame 84, description thereof is herein omitted.

The pressing arm 225 of the chute 22A is an arm extending from the chute 22A toward the actuator 83A. The pressing arm 225 has an extending portion 225*a* extending from the cover 222 of the chute 22A toward the actuator 83A, and an engaging portion 225*b* bent downward from a tip of the extending portion 225*a*.

The fourth lever 834 of the actuator 83A projects from the shaft 830 in a direction perpendicular to the axis X. For example, the fourth lever 834 projects upward from the shaft 830. The fourth lever 834 is configured to engage with the pressing arm 225. The pressing arm 225 engages with the fourth lever 834 to press the actuator 83A when the chute 22A pivots from the path forming position to the path opening position.

The anti-pivot rib 845 of the support frame 84A is configured to contact the first lever 831 of the actuator 83A. When in contact with the first lever 831, the anti-pivot rib 845 restricts the pivoting of the actuator 83A in the second direction W2.

The actuator 83A can move to the first position, the second position, and the third position by rotating about the axis X.

As shown in FIG. 14A, the first position is a position where the first lever 831 of the actuator 83A contacts the anti-pivot rib 845 in a state where the chute 22A is at the path forming position. When the actuator 83A is at the first position, the second lever 832 is interposed between the light-emitting element 811 and the light-receiving element 812, and thus the optical sensor 81 is off. When the actuator 83A is at the first position, the third lever 833 is disposed on the conveying path P1, and when the sheet S is conveyed to downstream of the fixing device 6 in the sheet conveying direction, the sheet S comes into contact with the third lever 833.

When the actuator 83A is at the first position and the first lever 831 contacts the anti-pivot rib 845, the pivoting of the actuator 83A in the second direction W2 is restricted by the anti-pivot rib 845. The pivoting of the actuator 83A at the first position in the first direction W1 is not restricted.

As shown in FIG. 14B, the second position is a position where the first lever 831 and the anti-pivot rib 845 are separated from each other in a state where the chute 22A is at the path forming position. The actuator 83A at the first position moves to the second position by rotating from the first position in the first direction W1 when the sheet S conveyed along the conveying path P1 abuts the third lever 833 in a state where the chute 22A is at the path forming position.

When the actuator 83A is moved to the second position, the second lever 832 is moved forward and is retracted from between the light-emitting element 811 and the light-receiving element 812, and thus the optical sensor 81 is turned on. When the actuator 83A is at the second position, the third lever 833 retracted below the conveying path P1. When the actuator 83A is at the second position, the first lever 831 is separated from the anti-pivot rib 845 in the forward direction.

As shown in FIG. 14C, the third position is a position where the first lever 831 and the anti-pivot rib 845 are separated from each other in a state where the chute 22A is at the path opening position. When the chute 22 pivots from the path forming position to the path opening position, the pressing arm 225 engages with the fourth lever 834 to press the actuator 83A at the first position in the first direction W1. The actuator 83A thereby pivots from the first position in the first direction W1 and move to the third position. That is, the pressing arm 225 of the chute 22A presses the actuator 83A in a direction in which the actuator 83A moves from the first position to the third position when the chute 22A pivots from the path forming position to the path opening position.

As described above, the actuator 83A can be forcibly moved from the first position to the third position in conjunction with the pivoting of the chute 22A from the path forming position to the path opening position by pressing the actuator 83A with the pressing arm 225 when the chute 22A pivots from the path forming position to the path opening position.

Since the pressing arm 225 is an arm that extends from the chute 22A toward the actuator 83A and engages with the fourth lever 834 of the actuator 83A, the actuator 83A can be moved from the first position to the third position in conjunction with the pivoting of the chute 22A from the path forming position to the path opening position with a simple configuration.

When the actuator 83A is moved to the third position, the second lever 832 is moved forward and retracted from between the light-emitting element 811 and the light-receiving element 812, and thus the optical sensor 81 is turned on. When the actuator 83 is at the third position, the first lever 831 is separated from the anti-pivot rib 845 in the forward direction.

The amount of movement of the actuator 83A in the first direction W1 from the first position to the third position is smaller than the amount of movement of the actuator 83A in the first direction W1 from the first position to the second position. However, the amount of movement of the actuator 83A in the first direction W1 from the first position to the third position may be the same as the amount of movement of the actuator 83A in the first direction W1 from the first position to the second direction. Similarly, the amount of movement of the actuator 83A in the first direction W1 from the first position to the third position may be greater than the amount of movement of the actuator 83A in the first direction W1 from the first position to the second position.

The left-right direction is an example of a width direction perpendicular to the sheet conveying direction according to aspects of the present disclosure. The pressing arm 225 is an example of a pressing member.

What is claimed is:

1. An image forming apparatus comprising:
a fixing device configured to fix toner on a sheet, the fixing device including a heater and a fixing device frame configured to support the heater;
a chute configured to pivot between a path forming position at which the chute forms a portion of a conveying path downstream of the fixing device in a sheet conveying direction and a path opening position at which the chute opens the conveying path;
an optical sensor including a light-emitting element configured to emit light and a light-receiving element configured to receive light emitted from the light-emitting element; and
an actuator having:
a shaft extending in a width direction perpendicular to the sheet conveying direction;
a first lever projecting from the shaft and configured to contact an anti-pivot rib; and
a second lever projecting from the shaft and configured to shield light emitted from the light-emitting element of the optical sensor,
wherein the actuator is movable to a first position where the first lever contacts the anti-pivot rib in a state where the chute is at the path forming position, a second position where the first lever and the anti-pivot rib are separated from each other in a state where the chute is at the path forming position, and a third position where the first lever and the anti-pivot rib are separated from each other in a state where the chute is at the path opening position, and
wherein the actuator and the optical sensor are supported by the fixing device frame.

2. The image forming apparatus according to claim 1, wherein the anti-pivot rib is provided to the chute.

3. The image forming apparatus according to claim 2, wherein the actuator:
has a third lever projecting from the shaft and disposed on the conveying path,
pivots from the first position in a first direction to the second position when the sheet conveyed along the conveying path comes into contact with the third lever in a state where the chute is at the path forming position, and
pivots from the first position in a second direction opposite to the first direction to the third position in a state where the chute is at the path opening position and the second lever and the anti-pivot rib are separated from each other.

4. The image forming apparatus according to claim 3, comprising a main body frame configured to cover the fixing device,
wherein the main body frame includes a restricting wall configured to abut against the third lever when the actuator moves from the first position to the third position to restrict pivoting of the actuator in the second direction.

5. The image forming apparatus according to claim 1, wherein the fixing device frame has a recess that does not interfere with the second lever when the actuator is at the second position.

6. The image forming apparatus according to claim 1, comprising a support frame configured to support the actuator and the optical sensor,
wherein the support frame is attached to the fixing device frame so that the actuator and the optical sensor are supported by the fixing device frame.

7. The image forming apparatus according to claim 6, wherein the support frame has an upstream frame disposed on an upstream side in the sheet conveying direction, and the upstream frame is disposed between the fixing device frame and the actuator and between the fixing device frame and the optical sensor in the sheet conveying direction.

8. The image forming apparatus according to claim 7, wherein:
the support frame has a downstream frame disposed on an opposite side of the actuator from the upstream frame,
the support frame has an opening between the upstream frame and the downstream frame,
the opening is open on a side of the actuator where the second lever extends and communicates with the outside, and
the chute has a cover configured to close the opening of the support frame when the chute is at the path forming position.

9. The image forming apparatus according to claim 6, wherein the support frame includes a conveying rib configured to guide the conveyed sheet.

10. The image forming apparatus according to claim 9, wherein:
the chute has a plurality of guide ribs arranged at intervals in the width direction,
the plurality of guide ribs includes a first guide rib arranged adjacent to the conveying rib in the width direction, and a second guide rib arranged further away from the conveying rib than the first guide rib in the width direction, and
a length of the first guide rib in the sheet conveying direction is shorter than a length of the second guide rib in the sheet conveying direction.

11. The image forming apparatus according to claim 1, wherein the chute includes a pressing member configured to press the actuator in a direction in which the actuator moves from the first position to the third position when the chute pivots from the path forming position to the path opening position.

12. The image forming apparatus according to claim 11, wherein the pressing member is an arm that extends from the chute toward the actuator and engages with the actuator when the chute pivots from the path forming position to the path opening position.

13. An image forming apparatus comprising:
a fixing device configured to fix toner on a sheet, the fixing device including a heater and a fixing device frame configured to support the heater;
a chute configured to pivot between a path forming position at which the chute forms a portion of a conveying path downstream of the fixing device in a sheet conveying direction and a path opening position at which the chute opens the conveying path;
an optical sensor including a light-emitting element configured to emit light and a light-receiving element configured to receive light emitted from the light-emitting element; and
an actuator having:
a shaft extending in a width direction perpendicular to the sheet conveying direction;
a first lever projecting from the shaft and configured to contact the chute; and a second lever projecting from the shaft and configured to shield light emitted from the light-emitting element of the optical sensor, wherein the actuator is movable to a first position where the first lever contacts the chute in a state where the chute is at the path forming position, a second position where the first lever and the chute are separated from each other in a state where the chute is at the path forming position, and a third position where the first lever and the chute are separated from each other in a state where the chute is at the path opening position, and wherein the actuator and the optical sensor are supported by the fixing device frame.

14. The image forming apparatus according to claim 13, wherein the actuator:

has a third lever projecting from the shaft and disposed on the conveying path, pivots from the first position in a first direction to the second position when the sheet conveyed along the conveying path comes into contact with the third lever in a state where the chute is at the path forming position, and pivots from the first position in a second direction opposite to the first direction to the third position in a state where the chute is at the path opening position and the second lever and the chute are separated from each other.

15. The image forming apparatus according to claim 14, comprising a main body frame configured to cover the fixing device, wherein the main body frame includes a restricting wall configured to abut against the third lever when the actuator moves from the first position to the third position to restrict pivoting of the actuator in the second direction.

16. The image forming apparatus according to claim 13, wherein the fixing device frame has a recess that does not interfere with the second lever when the actuator is at the second position.

17. The image forming apparatus according to claim 13, comprising a support frame configured to support the actuator and the optical sensor, wherein the support frame is attached to the fixing device frame so that the actuator and the optical sensor are supported by the fixing device frame.

18. The image forming apparatus according to claim 17, wherein the support frame has an upstream frame disposed on an upstream side in the sheet conveying direction, and the upstream frame is disposed between the fixing device frame and the actuator and between the fixing device frame and the optical sensor in the sheet conveying direction.

19. The image forming apparatus according to claim 18, wherein:

the support frame has a downstream frame disposed on an opposite side of the actuator from the upstream frame, the support frame has an opening between the upstream frame and the downstream frame, the opening is open on a side of the actuator where the second lever extends and communicates with the outside, and the chute has a cover configured to close the opening of the support frame when the chute is at the path forming position.

20. The image forming apparatus according to claim 17, wherein the support frame includes a conveying rib configured to guide the conveyed sheet.

21. The image forming apparatus according to claim 20, wherein:

the chute has a plurality of guide ribs arranged at intervals in the width direction, the plurality of guide ribs includes a first guide rib arranged adjacent to the conveying rib in the width direction, and a second guide rib arranged further away from the conveying rib than the first guide rib in the width direction, and a length of the first guide rib in the sheet conveying direction is shorter than a length of the second guide rib in the sheet conveying direction.

22. The image forming apparatus according to claim 13, wherein the chute includes a pressing member configured to press the actuator in a direction in which the actuator moves from the first position to the third position when the chute pivots from the path forming position to the path opening position.

23. The image forming apparatus according to claim 22, wherein the pressing member is an arm that extends from the chute toward the actuator and engages with the actuator when the chute pivots from the path forming position to the path opening position.

* * * * *